United States Patent [19]

Itoh et al.

[11] Patent Number: 5,306,684
[45] Date of Patent: Apr. 26, 1994

[54] CATALYST FOR PURIFICATION OF EXHAUST GASES

[75] Inventors: Takashi Itoh; Yukio Kosaki; Hiroyuki Yamaguchi, all of Ichikawa, Japan

[73] Assignee: N. E. Chemcat Corporation, Tokyo, Japan

[21] Appl. No.: 37,535

[22] Filed: Mar. 26, 1993

Related U.S. Application Data

[63] Continuation of Ser. No. 804,376, Dec. 10, 1991, abandoned.

[30] Foreign Application Priority Data

Jun. 18, 1991 [JP] Japan .................................. 3-173250

[51] Int. Cl.$^5$ .......................... B01J 29/04; B01J 29/06
[52] U.S. Cl. ........................................ 502/61; 502/60; 502/74
[58] Field of Search .......................... 502/60, 61, 74; 423/213.2, 213.5, 244.11

[56] References Cited

U.S. PATENT DOCUMENTS

| | | | |
|---|---|---|---|
| 3,976,745 | 8/1976 | Nakajima et al. | 423/239 |
| 5,041,270 | 8/1991 | Fujitani et al. | 423/213.2 |
| 5,051,393 | 9/1991 | Harrison et al. | 423/213.2 |
| 5,169,814 | 12/1992 | Yoshimoto et al. | 502/60 |
| 5,208,198 | 5/1993 | Nakano et al. | 502/74 |
| 5,223,236 | 6/1993 | Inoue et al. | 423/213.2 |

FOREIGN PATENT DOCUMENTS

| | | | |
|---|---|---|---|
| 0362960 | 4/1990 | European Pat. Off. . | |
| 2261810 | 9/1975 | France . | |
| 3036830 | 2/1988 | Japan | 423/239 |
| 2-187131 | 7/1990 | Japan | 423/239 |
| 3-101836 | 4/1991 | Japan | 423/213.2 |
| WO89/07005 | 8/1989 | PCT Int'l Appl. . | |
| 2193655 | 2/1988 | United Kingdom | 423/239 |

*Primary Examiner*—Carl F. Dees
*Attorney, Agent, or Firm*—Wenderoth, Lind & Ponack

[57] ABSTRACT

There is described a catalyst for purification of exhaust gases containing nitrogen oxides wherein oxygen is co-existent in excess of a stoichiometric amount, characterized in that a coprecipitated mixed oxide of copper and tin is loaded on a carrier composed of at least one type selected from the group consisting of crystalline aluminosilicate, aluminogallosilicate and gallosilicate, or the coprecipitated mixed oxide of copper and tin and further at least one noble metal selected from the group consisting of platinum, palladium, rhodium, iridium, ruthenium, silver and gold are co-loaded thereon.

This invention provides a lean NOx purification catalyst having high NOx purification performance and markedly increased durability over a wide temperature range.

4 Claims, 1 Drawing Sheet

CATALYST FOR PURIFICATION OF EXHAUST GASES

This application is a continuation of now abandoned application Ser. No. 07/804,376, filed Dec. 10, 1991.

BACKGROUND OF THE INVENTION

1. Field of the Invention

This invention relates to a catalyst for purification of exhaust gases in internal combustion engines, etc. More specifically, this invention relates to a catalyst suited for purification of nitrogen oxides exhausted from internal combustion engines.

2. Description of the Prior Art

Removal of atmospheric pollutants is a serious problem from the aspect of global environment conservation. Above all, removal of nitrogen oxides which are said to cause photochemical smog or acid rain is an urgent problem.

A selective catalytic reduction method using ammonia has been so far applied to exhaust gases from large-scaled fixed generation sources such as a thermoelectric power plant, etc., and some results have been thereby accomplished.

Meanwhile, a three way catalyst (TWC) method in which an air/fuel ratio is controlled to about a stoichiometric amount (A/F=14.7) and carbon monoxide (CO), hydrocarbons (H.C.) and nitrogen oxides (NOx) are simultaneously removed has been applied to exhaust gases of engines for on-site cogeneration or internal combustion engines of automobiles, trucks, etc.

However, in recent years, the amount of carbon dioxide ($CO_2$) exhausted has to be suppressed for prevention of global warming, and it has been demanded to put a lean burn engine to practical use. Nevertheless, the three way catalyst is not effective therefor.

Although a Diesel engine is inherently a lean burn engine, there has been no alternative but to use means such as exhaust gas recycle (EGR), fuel injection timing retard, etc. in order to suppress NOx of exhaust gases, and occurrence of floating particulates has been permitted to some extent. However, strict exhaust regulation will be imposed on both the particulates and NOx in the future. By the way, it is deemed that occurrences of particulates and NOx are in trade-off relationship in exhaustion of the Diesel engine and if the catalyst can effectively remove NOx, occurrence of particulates can be greatly suppressed.

Hereinafter, lean burn-system engines such as a lean burn gasoline engine, a Diesel engine and a gas engine are generally termed lean burn engines.

In order to purify nitrogen oxides in exhaust gases of the lean burn engines containing oxygen in excess of the stoichiometric amount, zeolite catalysts such as copper ion exchanged zeolites (U.S. Pat. No. 4,297,328 and Japanese Laid-open Patent Application No. 100919/1988), ion exchanged zeolites by noble metals such as platinum, palladium, rhodium, etc. (Japanese Laid-open Patent Application No. 135541/1989), and the like have been proposed in recent years.

These conventional zeolite catalysts nevertheless suffer fatal defects that the effective temperature region of NOx purification is limited and activity is heavily degraded in high-temperature exhaust gases containing steam. Thus, their performance has not yet reached the practical level. It has been generally presumed that low heat resistance of the zeolite catalysts is attributed to thermal instability of a zeolite crystal structure.

SUMMARY OF THE INVENTION

This invention has been made to solve the problems of the conventional catalysts. It is an object of this invention to provide a catalyst for purification of NOx, said catalyst having high activity and excellent heat resistance and durability to exhaust gases of a lean burn engine wherein oxygen is co-existent in excess of a stoichiometric amount.

The catalyst for purification of exhaust gases in this invention is characterized in that a coprecipitated mixed oxide of copper and tin is loaded on a carrier composed of at least one type selected from the group consisting of crystalline aluminosilicate, aluminogallosilicate and gallosilicate, or the coprecipitated mixed oxide of copper and tin and further at least one noble metal selected from the group consisting of platinum, palladium, rhodium, iridium, ruthenium, gold and silver are co-loaded on said carrier.

DETAILED DESCRIPTION OF THE PREFERRED EMBODIMENTS

Figure 1:
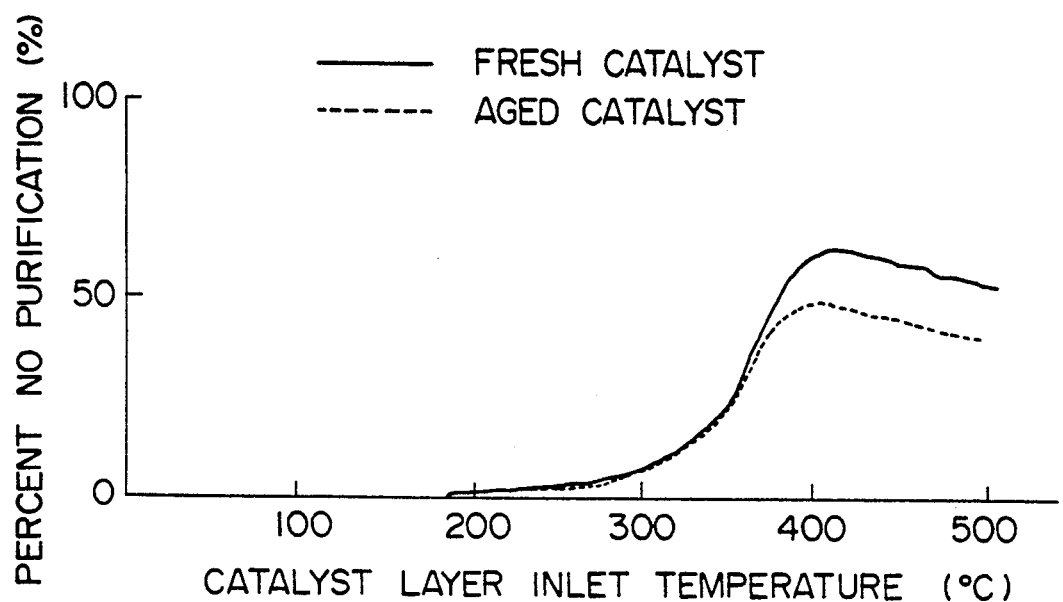
FIG. 1 shows NO purification light-off performance in mode C of the fresh catalyst (4) in Example 3 of this invention and the catalyst (4) after ageing.

It was reported by Fuller and Warwick [J. Catal., 34, 445–453 (1974), ibid., 42, 418–424 (1976)] that a coprecipitated mixed oxide gel of copper and tin becomes a catalyst for reaction of CO and $O_2$ or CO and NO in a low temperature region of less than 100° C. The reaction rate was, however, notably low.

A three-way catalyst in which copper oxide and tin oxide are loaded on an alumina carrier (Japanese Laid-open Patent Application No.210033/1989), or an oxidation catalyst or a three way catalyst in which a noble metal and tin oxide are loaded on alumina (Japanese Laid-open Patent Applications Nos. 141838/1981 and 175546/1985) is known. These catalysts are, however, hardly effective for purification of exhaust gases from the lean burn engine.

On the other hand, a catalyst in which copper and tin are loaded on zeolite has been little known.

The present inventors have investigated effects given by addition of various compounds to improve durability without impairing NOx purification activity of a copper loaded zeolite catalyst, and have, as a result, found that co-loading of tin oxide improves NOx purification activity, and more surprisingly that when copper and tin are loaded as a coprecipitated mixed oxide, an excellent synergistic effect is exhibited that can improve heat resistance of the zeolite catalyst by more than 100° C.

By the way, zeolite is, in an anhydrous state, crystalline aluminosilicate represented by the formula

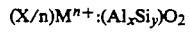

wherein M denotes at least one cation having a valence n, and x and y are mol fractions of Al and Si which are present as tetrahedral oxides in a skeletal structure and x+y=1), and can take a network structure by a three-dimensional coupling system of tetrahedrons of $SiO_4$ and $AlO_4$ constituting the skeleton. This network structure provides porosity which results in molecular sieve performance. Because part of $Si^{4+}$ ions in the skeletal structure of the zeolite are replaced with $Al^{3+}$ ions, a positive charge is lacking lacks, and $M^{n+}$, e.g., a cation such as $Na^+$ or $K^+$, is needed to compensate it, providing an ion exchange performance.

Meanwhile, a crystalline material in which Al in the skeleton of zeolite is isomorphously substituted with Ga is gallosilicate, and is called gallosilicate (percent substitution—almost 100%) or aluminogallosilicate (percent substitution—more than 0% but less than 100%) depending on the substitution rate. It is actually difficult to produce 100% pure gallosilicate. In a reagent usually available as a starting silica source in gel hydrothermal synthesis, Al is contained as an imuprity at a Si:Al atomic ratio of about 500:1 and incorporated into a product. In the present specification and claims, a substance containing Al in an amount as an unavoidable impurity is called "gallosilicate", and a substance containing Al added from outside in an amount more than the above or Al in a concentration increased by treatment after production as will be later described is called "aluminogallosilicate".

The present inventors disclosed before that crystalline aluminogallosilicate having a well-balanced atomic ratio of Al:Ga:Si in the skeletal structure has higher performance than aluminosilicate as a carrier of a copper loaded NOx purification catalyst (Japanese Patent Application No. 157894/1991).

The present inventors have found that by loading a coprecipitated mixed oxide of copper and tin, an excellent synergistic effect is shown on an aluminosilicate carrier as well as an aluminogallosilicate carrier and a gallosilicate carrier, and have perfected this invention.

In the present specification and claims, aluminosilicate, aluminogallosilicate and gallosilicate are termed carriers for convenience' sake, but they have further function than those as mere dispersion supports for catalytically active species and are therefore an essential component of the NOx purification catalyst.

The structure and the composition of crystalline aluminosilicate, aluminogallosilicate or gallosilicate which is the carrier and an essential component in this invention are not particularly limited. Expecially preferable is a chemical composition of the following formula in the anhydrous state $$\{(x+y)/n\}M^{n+}:(Al_xGa_ySi_z)O_2$$

wherein M denotes at least one cation having a valence n, and x, y and z are mol fractions of Al, Ga and Si present in a skeletal structure as tetrahedral oxides, and satisfy the following formulas.

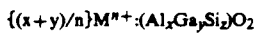

$$x+y+z=1.00, 0.882 \leq z \leq 0.990$$

This composition corresponds to:

$$15 \leq \{2z/(x+y)\} = \{SiO_2/(Al_2O_3+Ga_2O_3)\} \leq 200$$

When the Si/Al+Ga ratio is less than 7.5, the number of Al and/or Ga atoms in the crystal lattice becomes larger; even if the catalyst is a coprecipitated copper and tin mixed oxide loaded catalyst, hydrophilic nature becomes high and heat resistance decreases. On the contrary, when the Si/Al+Ga ratio is higher than 100, acidity of the catalyst decreases which leads to decrease in NOx purification activity.

As crystal structures of crystalline aluminosilicate, aluminogallosilicate and gallosilicate which are carriers of the catalyst in this invention, various structures such as MFI-, MEL-, MOR-, FEL- and TON-structures are effective. Of these, the MFI- and MEL-structures are most preferable.

In the present specification and claims, the nomenclature of the crystal structures of aluminosilicate, aluminogallosilicate and gallosilicate follows recommendation of IUPAC on the nomenclature of zeolites ("Chemical Nomenclature, and Formulation of Compositions of Synthetic and Natural Zeolites", IUPAC yellow booklet, 1978).

These crystalline aluminosilicate, aluminogallosilicate and gallosilicate can be produced by maintaining a uniformly mixed gel obtained by mixing a silica source and an alumina source and/or a gallia source as essential components constituting a gel in a gel hydrothermal synthesis method for a fixed time, e.g., for 10 hours to several hundreds of hours under a hydrothermal synthesis condition of 100° to 300° C. On this occasion, aluminosilicate, aluminogallosilicate or gallosilicate having various structures and various Si:Al ratios and/or Si:Ga ratios, Si:(Al+Ga) ratios and Al:Ga ratios can be produced by varying the ratio of the starting materials and the preparation conditions. Known methods for producing aluminosilicate or gallosilicate, e.g., methods of U.S. Pat. No. 3,702,886, British Patent Application No. 2053960 (MFI-structure), European Patent Application No. 106478A1, Japanese Laid-open Patent Application No. 73420/1984 (MEL-structure) and European Patent Application No. 130013A2 (TON-structure) can be applied thereto.

Regarding the hydrocarbon conversion catalyst, it is known that when the crystal form is the same but the Al:Ga:Si composition is changed, a pore diameter and/or acidity of aluminosilicate, gallosilicate and aluminogallosilicate is delicately changed, and catalytic performance is thus changed.

Even in the NOx purification of exhaust gases in the lean burn engine, hydrocarbons as a reducing agent necessary for selective reduction of NOx have to be first adsorbed on aluminosilicate, aluminogallosilicate or gallosilicate and activated. It is therefore advisable to optimize the network structure of the silicate and the Al:Ga:Si composition according to types of the hydrocarbons in the exhaust gases.

Highly crystalline aluminosilicate, aluminogallosilicate and gallosilicate are most preferable as a catalyst carrier in this invention. Generally, the higher is the crystallinity, i.e., the less lattice deficit, the higher becomes the heat resistance of silicate.

The high crystallinity aluminogallosilicate can be produced from, for example, crystalline silicate of a specific structure not containing gallium by a known Si-Ga substitution method (European Patent Application No. 187496A2). During the substitution reaction, Al as an unavoidable impurity is concentrated while leaching the low crystallinity portion of the intermediate silicate, and the high crystallinity aluminogallosilicate is formed.

An ordering degree of the crystal structure of aluminogallosilicate is evaluated by, e.g., sharpness of OH stretching vibration of FT-IR.

Such crystalline aluminosilicate, aluminogallosilicate or gallosilicate singly shows almost no NOx purification activity in the vicinity of the actual using conditions of exhaust gas treatment at space velocity of at least 10,000/hr.

It has been found, however, that a catalyst obtained by loading a coprecipitated mixed oxide of copper and tin on such crystalline aluminosilicate, aluminogallosilicate or gallosilicate or a catalyst obtained by co-loading thereon the coprecipitated mixed oxide of copper and tin and at least one noble metal selected from platinum, palladium, rhodium, ruthenium, iridium, silver and gold has high NOx purification activity and excellent durability over a wide temperature range of 200° to 800° C.

In the present secification and claims, unless otherwise indicated, copper oxide.tin oxide ($CuO.SnO_2$) means a coprecipitated mixed oxide which is differentiated from a mere mixture of copper oxide and tin oxide ($CuO + SnO_2$), a substance wherein tin oxide is loaded on copper oxide ($SnO_2/CuO$) or a substance wherein copper oxide is loaded on tin oxide ($CuO/SnO_2$).

Various combinations are effective as the noble metal-containing catalyst system of this invention. Most preferable are copper oxide.tin oxide-platinum, copper oxide.tin oxide-palladium, copper oxide.tin oxide-iridium, copper oxide tin oxide-gold, copper oxide.tin oxide-platinum-palladium, copper oxide.tin oxide-palladium-rhodium, copper oxide tin oxide-palladium-iridium, copper oxide.tin oxide-palladium-gold and copper oxide.tin oxide-iridium-gold.

The coprecipitated mixed oxide of copper and tin which is the essential component of this invention is loaded on crystalline aluminosilicate, aluminogallosilicate or gallosilicate as the carrier by various methods. For example, it is formed by impregnating a uniformly mixed solution containing copper and tin in a silicate carrier, adding an alkali such as aqueous ammonia, urea solution or sodium carbonate and coprecipitating the resulting product as a uniformly mixed hydroxide of copper and tin, or adding oxalic acid and coprecipitating the resulting product as a mixed oxalate salt, and calcining and decomposing it in air.

Examples of the copper compound to form the uniformly mixed solution of copper and tin are copper (II) nitrate, copper (II) chloride, copper (II) sulfate and copper (II) acetate. Examples of the tin compound are tin (IV) chloride, tin (IV) acetate, tin (II) chloride and tin (II) sulfate.

A calcination temperature after coprecipitating and loading the compounds of copper and tin onto the carrier is 300° to 900° C., preferably 450° to 700° C.; the above tempearture is maintained for 30 minutes to several hours.

When the calcination temperature is less than 300° C., decomposition of a precursor is insufficient and catalytic activity is low. When the calcination temperature is more than 900° C., the mixed oxide of copper and tin is separated into copper oxide and tin oxide which are sintered, lowering catalytic activity.

The coprecipitated mixed oxide of copper and tin loaded on aluminosilicate, aluminogallosilicate or gallosilicate in this invention does not have such clear crystal structure as can be detected by X-ray diffraction, but it is not a mere mixture of copper oxide and tin oxide.

According to an analytical electron microscope such as SEM-EDX, it is observed that in the catalyst of this invention, Cu and Sn at an almost constant ratio are distributed on each of the mixed oxide particles dispersed and loaded on the surfaces of particles or within the fine pores of the aluminosilicate carrier, etc.

Meanwhile, a catalyst prepared by mixing a copper oxide loaded aluminosilicate with a tin oxide loaded aluminosilicate at a given weight ratio does not exhibit the effect of the catalyst in this invention.

Aluminosilicate, aluminogallosilicate or gallosilicate and the coprecipiptated mixed oxide of copper and tin which are essential components of the catalyst in this invention need to be present in close contact with each other in a highly dispersed state.

For example, a catalyst obtained by only kneading the coprecipitated mixed oxide of copper and tin formed separately with aluminosilicate, aluminogallosilicate or gallosilicate is insufficient in activity and durability.

Thus, loading the catalytic component with good dispersibility is important for improving catalytic activity per loaded metal, preventing sintering at high temperatures under using conditions and prolonging catalyst life.

Even in the noble metal loaded catalyst as an improved embodiment of this invention, the noble metal can be loaded by various methods. However, aluminosilicate, alluminogallosilicate or gallosilicate loaded with the coprecipitated mixed oxide of copper and tin which is an essential component, and a noble metal or a noble metal oxide have to be present in close contact with each other. For instance, it is also possible that after the coprecipitated mixed oxide of copper and tin is previously loaded on aluminosilicate, a noble metal salt or compound is loaded by impregnation or ion exchange, or a mixed solution of salts or compounds of all the copper, tin and noble metal is added to a slurry of aluminosilicate, and simultaneously impregnated and loaded.

The salt or compound of the noble metal is not particularly limited. However, when they are coprecipitated simultaneously with copper and tin, it is necessary to select such compound as forming a uniformly mixed solution of all the components. For example, chloroplatinic acid, potassium chloroplatinate or dinitrodiaminoplatinum is available as a starting material of platinum. Sodium chloropalladate (II), palladium nitrate or dinitrodiaminopalladium is available as a starting material of palladium.

These noble metal components are stabilized by calcining them, after loading, at a temperature of 300° to 900° C., preferably 450° to 700° C. for 30 minutes to several hours.

Copper as one of the essential components of the catalyst in this invention is loaded on the silicate carrier in an amount of 0.05 to 15% by weight, preferably 0.5 to 5% by weight. When the loading amount of copper is too small, NOx purification performance is decreased. When it is too large, heat resistance of the catalyst is decreased. Tin is loaded on the silicate carrier in an amount of 0.5 to 20% by weight, preferably 1 to 10% by weight. When the loading amount of tin is too small, there is no effect of improvement in heat resistance of the catalyst. When it is too large, NOx purification performance is decreased.

A Cu/Sn atomic ratio is 0.1 to 10, preferably 0.5 to 2.0. When the amount of copper is too small relative to tin, NOx purification activity is suppressed, whereas when the amount of copper is too large, the effect of improvement in heat resistance rather reduced.

In the system wherein the noble metal is coexistent, a copper: noble metal M molar ratio is (M/Cu)≦10, preferably (M/Cu)≦1, more preferably (M/Cu)≦0.3. The addition of the noble metal further improves the low-temperature activity of the copper and tin coprecipitated mixed oxide-loaded crystalline aluminosilicate, aluminogallosilicate or gallosilicate catalyst, contributing to enlargement of the effective temperature region and improvement of durability. However, when the amount of the noble metal component is too large, oxidation activity for hydrocarbons becomes too high and NOx purification performance is rather decreased.

The catalyst of this invention may be in the form of a powder as such. Preferably, the catalyst is used by molding it in a given form either after mixing it with a suitable binder or without a binder, or by coating it on a suitable refractory supporting substrate.

Examples of the binder are inorganic binders such as silica sol, alumina sol and titania sol.

In case of molding, for example, silica sol and water are added to a catalyst powder, and they are kneaded, extruded and molded. The molded product may take various forms such as pellets, spheres, tablets and rings.

It is especially preferable that an article obtained by using a monolithic honeycomb structure as a supporting substrate and coating the catalyst of this invention on its surface is used to treat large amounts of exhaust gases with a low pressure drop.

Examples of the refractory supporting substrate are monolithes of ceramics such as cordierite, murite and alpha-alumina, and monolithes of metals such as aluminum-containing ferrite-type and austenite-type stainless steels.

A wash coat of the catalyst powder onto the refractory supporting substrate can be formed by, for example, adding silica sol and water to the catalyst powder, milling them to form a chixotropic slurry, impregnating a monolith substrate therein, and drying and calcining it.

In this invention, crystalline aluminosilicate, aluminogallosilicate or gallosilicate as a carrier may be formed or coated onto the refractory supporting substrate either before or after catalyzation, i.e., loading of the catalytic metal oxides or metal components onto the crystalline silicate. Namely, the catalytic metal oxides and metal components may be dispersed and loaded on the crystalline silicate without modification in the subsequent steps.

In case of treating exhaust gases with the catalyst of this invention, the gas space velocity (SV) is not particularly limited; it is preferably 5,000 to 200,000/hr, more preferably 10,000 to 150,000/hr. When it is too low, a catalyst of a large volume is needed. When it is too high, percent purification is decreased.

The catalyst of this invention is applied to treatment of exhaust gases containing NOx, H.C., CO, etc. in the internal combustion engine, and is especially effective when $O_2$ is contained in excess of the stoichiometric amount relative to the reducing agent such as H.C., $H_2$, CO., etc. By contacting exhaust gases with the catalyst of this invention, NOx of exhaust gases is reductively decomposed into $N_2$ and $H_2O$ with a reducing agent such as H.C., etc., existent in a small amount and at the same time, the reducing agent such as H.C., etc. is oxidized into $CO_2$ and $H_2O$ and removed.

Exhaust gases of the lean burn engine generally contain 2 to 6% of $O_2$ and NOx in a concentration of several hundreds to several thousands of ppm as well as H.C. in a concentration of several hundreds to several thousands of ppm (the H.C. concentration is calculated as $CH_4$, the same hereinafter), and they are contacted with the catalyst of this invention to achieve high percent NOx purification over a wide temperature range of the catalyst layer inlet exhaust gas temperature from 300° C. to more than 500° C.

Exhaust gases from the Diesel engine usually contain as high as 5 to 15% of $O_2$, and it is quite hard to selectively react NOx in a concentration of one to several hundreds of ppm with the remaining H.C. in a concentration of several tens to one hundred ppm. However, if the catalyst of this invention is used, purification of more than 30% becomes possible. Moreover, if employing a method of adding an unburned fuel in a concentration of several tens of ppm to the exhaust gas system and then contacting it with the catalyst of this invention, percent NOx purification of more than 50% can be achieved even for the exhaust gases of the Diesel engine.

Further, since the exhaust gases usually contain about 5 to 20% of moisture, the conventional zeolite catalysts heavily degrade activity above 700° C. On the contrary, the catalyst of this invention greatly improves heat resistance to the lean burn exhaust gases containing moisture at a temperature of up to about 800° C.

As has been stated above, the catalyst of this invention is effective for NOx purification of the exhaust gases containing NOx, H.C., CO, etc., especially NOx purification of the lean burn exhaust gases containing excess $O_2$ in the lean burn engine or the Diesel engine. Because the catalyst of this invention has high percent NOx purification and long-term stability, the effect of the exhaust gas purification system using said catalyst is great.

This invention is illustrated more specifically by the following Referential Examples, Examples, Comparative Examples and Performance Evaluation Examples. However, this invention is not limited thereto.

REFERENTIAL EXAMPLE 1

Production of an aluminosilicate carrier

Crystalline aluminosilicates having various structures and compositions are produced in the following manner.

While vigorously stirring a solution (I) comprising, as shown in Table 1, (a) g of 97% sulfuric acid, (c) g of a templating agent (b: TPAB=tetrapropylammonium bromide) and (d) g of deionized water, a solution (II) comprising (e) g of sodium hydroxide, (f) g of sodium aluminate ($NaAlO_2$) and (g) g of deionized water and a solution (III) containing (h) g of 30% colloidal silica were simultaneously added dropwise at a fixed rate and mixed. After stirring for 15 minutes, the resulting solution was charged into a stainless steel autoclave, and maintained with stirring at 170° C. under autogeous pressure for 100 hours. The product was filtered, washed, treated with a 0.2 N ammonium nitrate aqueous solution and calcined in air at 550° C. for 5 hours. There resulted hydrogen-type aluminosilicates (AS-01 and AS-02). The crystal structures of the products were identified by powder X-ray diffraction. The structures and the compositions of the products are shown in Table 1.

TABLE 1

| | Production of an aluminosilicate carrier | | | | | | | | | | | |
|---|---|---|---|---|---|---|---|---|---|---|---|---|
| | Solution (I) | | | | Solution (II) | | | Solution (III) | Hydrogen-type aluminosilicate | | | |
| | 97% $H_2SO_4$ | Templating agent | | $H_2O$ | NaOH | $NaAlO_2$ | $H_2O$ | 30% $SiO_2$ sol | Crystal | Product composition | | |
| No. | (a)g | (b) | (c)g | (d)g | (e)g | (f)g | (g)g | (h)g | structure | $SiO_2/Al_2O_3$ | x | y | z |
| AS-01 | 99.2 | TPAB | 128 | 1600 | 94.4 | 26.1 | 800 | 960 | MFI | 60 | 0.032 | 0 | 0.968 |
| AS-02 | 70.8 | TPAB | 128 | 1600 | 94.4 | 15.7 | 800 | 1000 | MFI | 100 | 0.020 | 0 | 0.980 |

REFERENTIAL EXAMPLE 2

Production of an aluminogallosilicate a carrier (1)

While vigorously stirring a solution (I) comprising, as shown in Table 2, (a) g of 97% sulfuric acid, (b) g of gallium nitrate ($Ga(NO_3)_3 \cdot 8H_2O$), (d) g of a templating agent (c: TPAB = tetrapropylammonium bromide, TEAB = tetraethylammonium bromide) and (e) g of deionized water, a solution (II) comprising (f) g of sodium hydroxide, (g) g of sodium aluminate ($NaAlO_2$) and (h) g of deionized water and a solution (III) containing (i) g of 30% colloidal silica were simultaneously added dropwise at a fixed rate and mixed, followed by hydrothermal synthesis and ion exchange treatment as in Referential Example 1. The structures and the compositions of resulting hydrogen-type aluminogallosilicates (AGS-01 and AGS-02) are shown in Table 2.

TABLE 2

| | Production of an aluminogallosilicate | | | | | | | | |
|---|---|---|---|---|---|---|---|---|---|
| | Solution (I) | | | | | Solution (II) | | | |
| | 97% $H_2SO_4$ | $Ga_2(NO_3)_3 \cdot 8H_2O$ | Templating agent | | $H_2O$ | NaOH | $NaAlO_2$ | $H_2O$ | |
| No. | (a)g | (b)g | (c) | (d)g | (e)g | (f)g | (g)g | (h)g | |
| AGS-01 | 96.0 | 31.3 | TPAB | 128 | 1600 | 94.4 | 11.5 | 800 | |
| AGS-02 | — | 11.2 | TEAB | 42 | 1200 | 164.6 | 9.2 | 1200 | |

| | Solution (III) | | Hydrogen-type aluminogallosilicate | | | | | |
|---|---|---|---|---|---|---|---|---|
| | 30% $SiO_2$ sol | Crystal | Composition | | | | | |
| No. | (i)g | structure | $\frac{SiO_2}{Al_2O_3}$ | $\frac{SiO_2}{Ga_2O_3}$ | $\frac{SiO_2}{Al_2O_3 + Ga_2O_3}$ | x | y | z |
| AGS-01 | 950 | MFI | 120 | 120 | 60 | 0.016 | 0.016 | 0.968 |
| AGS-02 | 1300 | MOR | 20 | 140 | 17.5 | 0.090 | 0.013 | 0.898 |

REFERENTIAL EXAMPLE 3

Production of a gallosilicate carrier

While vigorously stirring a solution (I) comprising, as shown in Table 3, (a) g of gallium nitrate ($Ga_2(NO_3)_3 \cdot 8H_2O$), (c) g of a templating agent (b: TPAM = tetrapropylammonium bromide, TBAB = tetrabutylammonium bromide) and (d) g of deionized water, a solution (II) comprising (e) g of sodium hydroxide and (f) g of deionized water was slowly added dropwise over a period of about 40 minutes. Then, a solution (III) containing (g) g of 30% colloidal silica was added dropwise at a fixed rate over a period of 30 minutes. After stirring for another 15 minutes, the resulting solution was charged into a stainless steel autoclave, and treated as in Referential Example 1.

The compositions and the structures of the resulting hydrogen-type gallosilicates (GS-01 and GS-02) are shown in Table 3.

TABLE 3

| | Production of a gallosilicate carrier | | | | | | |
|---|---|---|---|---|---|---|---|
| | Solution (I) | | | | Solution (II) | | Solution (III) |
| | $Ga_2(NO_3)_3 \cdot 8H_2O$ | Templating agent | | $H_2O$ | NaOH | $H_2O$ | 30% $SiO_2$ sol |
| No. | (a)g | (b) | (c)g | (d)g | (e)g | f(g) | (g)g |
| GS-01 | 61.9 | TPAB | 190 | 1000 | 26.5 | 760 | 1000 |
| GS-02 | 61.9 | TBAB | 231 | 1000 | 26.5 | 760 | 1000 |

| | Hydrogen-type gallosilicate | | | | | | |
|---|---|---|---|---|---|---|---|
| | | Composition | | | | | |
| No. | Crystal structure | $\frac{SiO_2}{Al_2O_3}$ | $\frac{SiO_2}{Ga_2O_3}$ | $\frac{SiO_2}{Al_2O_3 + Ga_2O_3}$ | x | y | z |
| GS-01 | MFI | 1000 | 60 | 57 | 0.0019 | 0.032 | 0.966 |
| GS-02 | MEL | 1000 | 60 | 57 | 0.0019 | 0.032 | 0.966 |

REFERENTIAL EXAMPLE 4

Production of an aluminogallosilicate carrier (2)

(a) Production of silicalite

With stirring, 136 ml an aqueous solution containing 10.8 g of sodium hydroxide was added dropwise to 340 g of 30% colloidal silica. 100 ml of an aqueous solution containing 23.2 g of tetrapropylammonium bromide were added thereto dropwise. The resulting gel was charged in a stainless steel autoclave, and the reaction was performed at 170° C. under autogenous pressure for 100 hours with stirring. The resulting product was filtered, washed, dried and calcined in air at 600° C. for 2 hours to obtain 90 g of silicalite-I having a MFI-structure.

(b) Substitution with gallium 90 g of the silicalite powder obtained in (a) were added to 2,000 ml of deionized water to form a slurry, and 400 ml of a 0.2N sodium hydroxide aqueous solution containing 22.6 g of gallium sulfate was added to the slurry. After maintaining the mixture for 4 hours under heating and refluxing conditions, the product was filtered, washed, and treated with a 0.2N ammonium nitrate aqueous solution. The resulting product was further filtered, washed, dried and calcined at 550° C. for 5 hours to afford 40 g of hydrogen-type aluminogallosilicate (AGS-03) having an MFI-structure with a composition of $SiO_2/Ga_2O_3=24$, $SiO_2/Al_2O_3=264$, $SiO_2/(Al_2O_3+Ga_2O_3)=22$, $x=0.007$, $y=0.076$ and $z=0.917$.

EXAMPLE 1

Production of a copper oxide tin oxide-loaded aluminosilicate catalyst (1)

(a) Loading of copper oxide.tin oxide onto a powdery carrier 50 g of the crystalline aluminosilicate (AS-01) powder were added to 1,400 ml of deionized water to form a slurry. With stirring, 300 ml of a mixed aqueous solution comprising copper (II) nitrate ($Cu(NO_3)_2.3H_2O$) containing 2.35 g of Cu and tin (IV) chloride ($SnCl_4.5H_2O$) containing 4.63 g of Sn was added thereto drowise. Then, while vigorously stirring the slurry, 2% aqueous ammonia was slowly added dropwise to adjust pH to 7.0 in 40 minutes. The product was filtered, and the filtrate was washed until said filtrate was chloride-free, followed by drying it at 100° C. for 16 hours. The cake was pulverized, and the powder was calcined in air at 550° C. for 4 hours to obtain 58.8 g of a 15% copper oxide.tin oxide (Cu/Sn molar ratio 1) loaded aluminosilicate powder ($Cu.SnO_2/As-01$).

(b) Wash coat onto a honeycomb 2.0 g of 30% silica sol and 50 ml of deionized water were added to 30 g of the catalyst powder, and the mixture was milled with a ball mill for 16 hours to obtain a slurry. A core piece of 2.54 cm in diameter and 5 cm in length which was hollowed out from a commercial cordierite honeycomb having 400 cells was impregnated with the slurry. Excess slurry was removed by air blowing. The resulting product was dried, and then calcined at 500° C. for 30 minutes to obtain a honeycomb catalyst (1) which was coated with 100 g, calculated on dry basis, of the catalyst per L of the honeycomb.

In the same way as above, a 15% copper oxide.tin oxide loaded aluminosilicate ($CuO.SnO_2/AS-02$) honeycomb catalyst (2) was obtained from the aluminosilicate carrier (AS-02).

EXAMPLE 2

Production of a copper oxide.tin oxide loaded aluminosilicate catalyst (2)

A 13% copper oxide.tin oxide loaded aluminosilicate ($CuO.2SnO_2/AS-01$) honeycomb catalyst (3) was obtained as in Example 1 except that a mixed solution of copper nitrate containing 1.18 g of Cu and tin chloride containing 4.63 g of Sn was added dropwise to a slurry of 50 g of the aluminosilicate (AS-01) powder.

EXAMPLE 3

Production of a copper oxide.tin oxide loaded aluminogallosilicate catalyst and a copper oxide.tin oxide loaded gallosilicate catalyst In the same way as in Example 1, honeycomb catalysts (4)-(8) were obtained via various 15% copper oxide.tin oxide loaded aluminogallosilicate ($CuO.SnO_2/AGS-01$ to $AGS-03$) catalyst powders and gallosilicate ($CuO.SnO2/GS-01$ and $GS-02$) catalysts except using aluminogallosilicates (AGS-01 to AGS-03) and gallosilicates (GS-01 and GS-02) instead of the aluminosilicate carrier. These catalysts were adjusted as the rate of coating onto the honeycomb was 100 g/L.

EXAMPLE 4

Production of a copper oxide.tin oxide/platinum loaded aluminosilicate catalyst 50 g of aluminosilicate (AS-01) were added to 1,000 ml of deionized water to form a slurry. 100 ml of an aqueous solution containing 2.0 mmols of tetraammineplatinum dichloride ($[Pt(NH_3)_4]Cl_2$ were added thereto and impregnated therein at room temperature for 16 hours. Subsequently, the product was filtered, washed, dried and calcined in air at 500° C. for 1 hour to obtain a 0.6% platinum loaded aluminosilicate (ion exchange rate 23%) powder.

Then, a 15% copper oxide.tin oxide/0.5% platinum loaded aluminosilicate honeycomb catalyst (9) was formed as in Example 1 except using platinum loaded aluminosilicate instead of aluminosilicate (AS-01).

EXAMPLE 5

Production of a iridium-copper oxide.tin oxide loaded aluminosilicate catalyst

Using 50 g of the aluminosilicate (AS-02) powder and 300 ml of a uniformly mixed aqueous solution of iridium (IV) tetrachloride containing 0.30 g of Ir, copper (II) nitrate containing 2.57 g of Cu and tin (IV) chloride containing 4.81 g of Sn, a 0.5% iridium-15% copper oxide.tin oxide loaded aluminosilicate ($Ir-CuO.SnO/AS-02$) honeycomb catalyst (10) was obtained in the same way as in Example 1.

EXAMPLE 6

Production of a gold/copper oxide.tin oxide loaded aluminogallosilicate catalyst The 15% copper oxide.tin oxide loaded aluminogallosilicate ($CuO.SnO_2/AGS-02$) honeycomb catalyst (5) obtained in Example 3 was dried at 100° C. for 5 hours. The dry honeycomb catalyst (volume 25.3 cm³, water absorption 130-140 g/L of the honeycomb) was impregnated with 50 ml of a chloroplatinic acid (III) ($HAuCl_4$) aqueous solution containing 0.185 g of Au for 3 minutes. Excess solution was removed by air blowing. The resulting product was dried and calcined at 500° C. for 1 hour to afford a 0.5% gold/15% copper oxide.tin oxide loaded aluminogallosilicate ($Au/CuO.SnO_2/AGS-02$) honeycomb catalyst (11).

COMPARATIVE EXAMPLE 1

Production of a copper ion exchanged aluminosilicate catalyst and a copper ion exchanged gallosilicate catalyst 50 g of the aluminosilicate (AS-01) powder were impregnated with 1,000 ml of a 0.05M copper acetate aqueous solution at room temperature for 16 hours, filtered, washed and dried to provide a copper ion exchanged aluminosilicate (Cu/AS-01) catalyst at an ion exchange rate of 100%. A honeycomb catalyst (12) was obtained as in (b) of Example 1.

Likewise, a honeycomb catalyst (13) was provided by loading copper on gallosilicate (GS-01) via ion exchange.

COMPARATIVE EXAMPLE 2

Production of a copper oxide loaded aluminosilicate catalyst and a copper oxide loaded gallosilicate catalyst A 5% copper oxide loaded aluminosilicate (CuO/AS-02) honeycomb catalyst (14) was formed as in Example 1 except that an aqueous solution of copper nitrate alone containing 2.10 g of Cu was added dropwise to a slurry of 50 g of the aluminosilicate (AS-02) powder.

Likewise, copper oxide was loaded on gallosilicate (GS-03) to obtain a copper oxide loaded gallosilicate (CuO/GS-03) honeycomb catalyst (15).

COMPARATIVE EXAMPLE 3

Production of a tin oxide loaded aluminosilicate catalyst

A 10% tin oxide loaded aluminosilicate (SnO2/AS-01) honeycomb catalyst (16) was obtained as in Example 1 except that an aqueous solution of tin (IV) chloride alone containing 4.38 g of Sn was added dropwise to a slurry of 50 g of the aluminosilicate (AS-01) powder.

COMPARATIVE EXAMPLE 4

Production of a copper ion exchanged/tin oxide loaded aluminosilicate catalyst 50 g of the 10% tin oxide loaded aluminosilicate ($SnO_2$/AS-01) powder obtained in Comparative Example 3 was slurried, and the slurry was treated with 1,000 ml of a 0.05M copper acetate aqueous solution as in Comparative Example 1 to afford a copper ion exchanged/tin oxide loaded aluminosilicate (Cu/$SnO_2$/AS-01) honeycomb catalyst (17) at an ion exchange rate of 120%.

COMPARATIVE EXAMPLE 5

Production of a copper oxide/tin oxide loaded aluminosilicate catalyst

Using the 10% tin oxide loaded aluminosilicate ($SnO_2$/AS-01) powder obtained in Comparative Example 3, copper oxide was loaded as in Comparative Example 2 to obtain a 4.5% copper oxide/9.6% tin oxide loaded aluminosilicate (CuO/$SnO_2$/AS-01) honeycomb catalyst (18).

COMPARATIVE EXAMPLE 6

Production of a copper oxide.tin oxide loaded alumina catalyst

A 15% copper oxide.tin oxide loaded alumina (CuO.$SnO_2$/$Al_2O_3$) honeycomb catalyst (19) was produced as in Example 1 except that gamma-alumina (KHA-24: a trademark for a product of Sumitomo Chemical Co., Ltd.) was used instead of the aluminosilicate (AS-01) carrier.

COMPARATIVE EXAMPLE 7

Production of a copper oxide.tin oxide loaded silicalite catalyst

A 15% copper oxide.tin oxide loaded silicalite (CuO.$SnO_2$/$SiO_2$) honeycomb catalyst (20) was obtained as in Example 1 except that silicalite formed in (a) of Referential Example 4 was used instead of the aluminosilicate (AS-01) carrier.

COMPARATIVE EXAMPLE 8

Production of a copper oxide.tin oxide coprecipitated gel

While vigorously stirring 5 liters of a mixed aqueous solution of tin (IV) chloride containing 31.1 g of Sn and copper (II) nitrate containing 8.3 g of Cu, 2% aqueous ammonia was slowly added thereto dropwise, and pH was adjusted to 7.0 over a period of about 1 hour. The product was filtered, washed, dried, and then calcined in air at 550° C. for 4 hours to obtain a copper oxide.tin oxide coprecipitated gel (CuO.2$SnO_2$) (Cu/Sn molar ratio = 1/2) having a BET specific surface area of 90 $m^2$/g. Said gel was coated onto a honeycomb to obtain a honeycomb catalyst (21).

COMPARATIVE EXAMPLE 9

Production of a copper oxide.tin oxide + aluminosilicate mixed catalyst 2.0 g of 30% silica sol and 50 ml of deionized water were added to 4.5 g of the copper oxide.tin oxide coprecipitated gel (CoO.2$SnO_2$) obtained in Comparative Example 8 and 25.5 g of the aluminosilicate (AS-01) powder, and the mixture was milled with a ball mill for 16 hours to obtain a slurry. The slurry was coated onto a honeycomb as in (b) of Example 1 to afford a 15% copper oxide.tin oxide + 85% aluminosilicate (CuO.2$SnO_2$+AS-01) mixed honeycomb catalyst (22).

COMPARATIVE EXAMPLE 10

Production of a Pt-Rh loaded alumina catalyst (TWC)

Activated alumina (120 g) having a BET specific surface area of 150 $m^2$/g and an average particle size of 30 microns were charged in a mixer, and with stirring, 30 ml of an amine aqueous solution of platinum hydroxide containing 2.0 g of platinum was added thereto dropwise in small portions, and uniformly dispersed and loaded therein. Subsequently, 15 ml of a rhodium nitrate aqueous solution containing 0.41 g of rhodium was added thereto dropwise in small portions, and uniformly dispersed and loaded therein. Then, 10 ml of 25% acetic acid was added dropwise in small portions to produce a 1.7% Pt-0.34% Rh loaded alumina powder (PT-Rh weight ratio=5/1). Said powder was treated as in (b) of Example 1 to obtain a Pt-Rh/gamma-$Al_2O_3$ honeycomb catalyst (23).

PERFORMANCE EVALUATION EXAMPLE 1

Evaluation of exhaust gas purification performance (1)

(a) Evaluation by a lean burn gasoline engine model exhaust model gas

Regarding the catalysts (1)–(11) in Examples of this invention and the catalysts (12)–(23) in Comparative Examples, a mixed gas (corresponding to A/F = 19) comprising 500 ppm of NO, 1,500 ppm of propylene $C_3H_6$, 5% of $O_2$ and a balance of $N_2$, as a lean burn gasoline engine exhaust model gas, was fed on a honeycomb piece of each catalyst with 400 cells each having a diameter of 2.54 cm and a length of 5 cm at SV of 40,000/hr. While raising the catalyst layer inlet gas temperature at a rate of temperature rise of 30° C./min, NO purification performance was measured (mode A).

Percent NO purifications at the catalyst layer inlet gas temperatures of 350° C. and 450° C. are shown in Table 4.

(b) Evaluation by a Diesel engine exhaust model gas

Regarding the catalysts (1), (4)-(6), (8), (10) and (11) in Examples of this invention and the catalysts (12), (13), (16), (17), (19) and (21)-(23) in Comparative Examples, a mixed gas comprising 500 ppm of NO, 1,500 ppm of $C_3H_6$, 15% of $O_2$ and a balance of $N_2$, as a Diesel engine exhaust model gas, was fed at SV of 40,000/hr as in (a), and NO purification performance was measured (mode B).

Percent NO purifications at 350° C. and 450° C. are shown in Table 5.

From Tables 4 and 5, it is clear that the catalysts of this invention show, at the temperature of 350° to 450° C, average percent NO purification of higher than 45% in mode A and average percent NO purification of higher than 45% even in mode B. By contrast, the conventional catalysts in Comparative Examples show average percent NO purification of as low as 40% in mode A and average percent NO purification of as low as less than 34% in mode B. It is thus clear that the copper.tin coprecipitated mixed oxide loaded aluminosilicate, aluminogallosilicate or gallosilicate catalysts in this invention show high percent NOx purification over the wide temperature range.

Among the catalysts of this invention, the catalysts (9), (10) and (11) with both the copper oxide.tin oxide and the noble metal co-loaded may be inferior to the catalysts (1), (2) and (5) with the copper oxide.tin oxide alone loaded on the same carrier in maximum percent NO purification at the specific temperature range. However, the former are higher in low-temperature activity of NO purification and better in average percent NO purification in the wide temperature range than the latter.

PERFORMANCE EVALUATION EXAMPLE 2

Evaluation of heat resistance of catalysts

The catalysts (1)-(11) in Examples of this invention and the catalysts (12)-(23) in Comparative Examples were aged at 700° C. for 5 hours in a 10% steam-containing air stream, and then subjected to the model gas evaluation tests in modes A and B as in Performance Evaluation Example 1. Percent NO purifications at temperatures of 350° C. and 450° C. in modes A and B are shown in Tables 4 and 5 respectively.

TABLE 4

NO purification performance of fresh catalysts or catalysts after ageing (mode A)

| | Catalysts No. | Type | Percent NO purification of fresh and aged catalysts | | Percent NO purification of aged catalysts | |
|---|---|---|---|---|---|---|
| | | | $C_{350}$ (%) | $C_{450}$ (%) | $C_{350}$ (%) | $C_{450}$ (%) |
| Example 1 | (1) | $CuO.SnO_2$/AS-01 | 62 | 68 | 14 | 54 |
| | (2) | $CuO.SnO_2$/AS-02 | 32 | 57 | 6 | 44 |
| Example 2 | (3) | $Cuo.2SnO_2$/AS-01 | 55 | 60 | 15 | 48 |
| Example 3 | (4) | $Cuo.SnO_2$/AGS-01 | 55 | 62 | 12 | 48 |
| | (5) | $Cuo.SnO_2$/AGS-02 | 42 | 80 | 10 | 42 |
| | (6) | $CuO.SnO_2$/AGS-03 | 30 | 82 | 8 | 49 |
| | (7) | $CuO.SnO_2$/GS-01 | 30 | 64 | 4 | 41 |
| | (8) | $CuO.SnO_2$/GS-02 | 20 | 72 | 0 | 42 |
| Example 4 | (9) | $CuO.SnO_2$/Pt/AS-01 | 65 | 65 | 28 | 40 |
| Example 5 | (10) | Ir—$Cuo.SnO_2$/AS-02 | 40 | 60 | 16 | 40 |
| Example 6 | (11) | Au/$Cuo.SnO_2$/AGS-02 | 68 | 70 | 14 | 45 |
| Comparative Example 1 | (12) | Cu/AS-01 | 16 | 62 | 4 | 32 |
| | (13) | Cu/GS-01 | 26 | 54 | 2 | 25 |
| Comparative Example 2 | (14) | CuO/AS-02 | 36 | 44 | 0 | 20 |
| | (15) | CuO/GS-02 | 20 | 52 | 0 | 16 |
| Comparative Example 3 | (16) | $SnO_2$/AS-01 | 0 | 0 | — | — |
| Comparative Example 4 | (17) | Cu/$SnO_2$/AS-01 | 0 | 46 | 0 | 20 |
| Comparative Example 5 | (18) | CuO/$SnO_2$/AS-01 | 18 | 48 | 5 | 24 |
| Comparative Example 6 | (19) | $CuO.SnO_2$/$Al_2O_3$ | 7 | 15 | — | — |
| Comparative Example 7 | (20) | $CuO.SnO_2$/$SiO_2$ | 0 | 2 | — | — |
| Comparative Example 8 | (21) | $CuO.2SiO_2$ | 5 | 2 | — | 2 |
| Comparative Example 9 | (22) | $CuO.2SiO_2$ + AS-01 | 0 | 30 | 2 | 16 |
| Comparative Example 10 | (23) | Pt—Rh/$Al_2O_3$ (TWC) | 10 | 0 | 7 | 0 |

TABLE 5

NO purification performance of fresh catalysts or catalysts after ageing (mode B)

| | Catalysts No. | Type | Percent NO purification of fresh and aged catalysts | | Percent NO purification of aged catalysts | |
|---|---|---|---|---|---|---|
| | | | $C_{350}$ (%) | $C_{450}$ (%) | $C_{350}$ (%) | $C_{450}$ (%) |
| Example 1 | (1) | $CuO.SnO_2$/AS-01 | 56 | 50 | 53 | 40 |
| Example 2 | (4) | $CuO.SnO_2$/AGS-01 | 53 | 45 | 20 | 37 |
| | (5) | $CuO.SnO_2$/AGS-02 | 70 | 56 | 40 | 34 |
| | (6) | $CuO.SnO_2$/AGS-03 | 55 | 45 | 16 | 37 |
| | (8) | $CuO.SnO_2$/GS-02 | 54 | 42 | 17 | 47 |
| Example 5 | (10) | Ir—$CuO.SnO_2$/AS-02 | 58 | 48 | 24 | 42 |
| Example 6 | (11) | Au/$Cuo.SnO_2$/AGS-02 | 60 | 54 | 53 | 44 |
| Comparative Example 1 | (12) | Cu/AS-01 | 20 | 42 | 18 | 22 |
| | (13) | Cu/GS-01 | 28 | 40 | 12 | 25 |
| Comparative Example 3 | (16) | $SnO_2$/AS-01 | 0 | 0 | — | — |
| Comparative Example 4 | (17) | Cu/$SnO_2$/AS-01 | 10 | 48 | 2 | 15 |
| Comparative Example 6 | (19) | $CuO.SnO_2$/$Al_2O_3$ | 8 | 13 | — | — |
| Comparative Example 8 | (21) | $CuO.2SiO_2$ | 3 | 0 | — | — |
| Comparative Example 9 | (22) | $CuO.2SiO_2$ + AS-01 | 0 | 24 | 7 | 12 |

TABLE 5-continued

| | | | NO purification performance of fresh catalysts or catalysts after ageing (mode B) | | | |
|---|---|---|---|---|---|---|
| | | | Percent NO purification of fresh and aged catalysts | | Percent NO purification of aged catalysts | |
| | Catalysts No. | Type | $C_{350}$ (%) | $C_{450}$ (%) | $C_{350}$ (%) | $C_{450}$ (%) |
| Comparative Example 10 | (23) | Pt—Rh/$Al_2O_3$ (TWC) | 2 | 0 | 1 | 0 |

Tables 4 and 5 reveal that compared to the conventional catalysts, the catalysts of this invention maintain high percent NO purification performance even after thermal ageing.

PERFORMANCE EVALUATION EXAMPLE 3

Evaluation of exhaust gas purification performance (2)

Regarding the catalyst (4) in Example 3 of this invention and the catalyst (12) in Comparative Example 1, a mixed gas comprising 1,000 ppm of NO, 3,000 ppm of CO, 1,300 ppm of $C_3H_6$, 1,000 ppm of $H_2$, 3.5% of $O_2$, 10% of $CO_2$, 10% of $H_2O$ and a balance of $N_2$, as a lean burn gasoline engine exhaust model gas, was fed on the 400-cell honeycomb piece of the same size as in Performance Evaluation Example 1 at SV of 100,000/hr. While raising the catalyst layer inlet temperature at a rate of temperature rise of 30° C./min, NO purification performance was measured (mode C).

The performance of the fresh catalysts was evaluated. Then, the catalysts were aged under the same conditions as in Performance Evaluation Example 2, and their performance was evaluated again in mode C.

Figure 2:
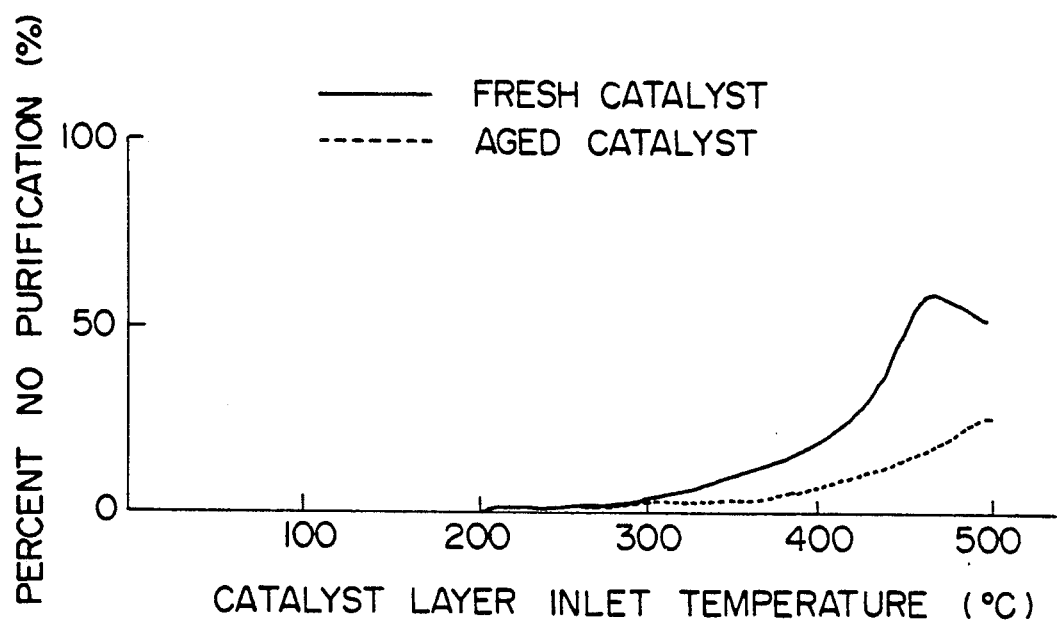
FIG. 2 shows NO purification light-off performance in mode C of the fresh catalyst (12) in Comparative Example 1 and the catalyst (12) after ageing.

The NO purification light-off performance curves before and after aging of the catalyst (4) in Example 3 are shown in FIG. 1 and those of the catalyst (12) in Comparative Example 1 in FIG. 2 respectively.

Thus, as regards the catalyst (4) in Example 3, NO purification activity is maintained at 80% with almost no shift of light-off temperature to a higher rise temperature side even after ageing, and heat resistance is greatly improved in comparison with that of the conventional catalyst in Comparative Example 1.

What is claimed is:

1. A catalyst for removal of nitrogen oxides from exhaust gases wherein oxygen is present in excess of the stoichiometric amount required for completely oxidizing the entire amount of reducing components contained in the exhaust gases and also containing hydrocarbons, which comprises a coprecipitated mixed oxide of copper and tin loaded on a carrier composed of at least one type selected from the group consisting of crystalline aluminosilicate, aluminogallosilicate and gallosilicate.

2. The catalyst of claim 1 which is either molded in a fixed shape or coated onto a refractory supporting substrate.

3. A catalyst for removal of nitrogen oxides from exhaust gases wherein oxygen is present in excess of the stoichiometric amount required for completely oxidizing the entire amount of reducing components contained in the exhaust gases and also containing hydrocarbons, which comprises a coprecipitated mixed oxide of copper and tin and further at least one noble metal selected from the group consisting of platinum, palladium, rhodium, iridium, ruthenium, silver and gold co-loaded on a carrier composed of at least one type selected from the group consisting of crystalline alumiosilicate, aluminogallosilicate and gallosilicate.

4. The catalyst of claim 3 which is either molded in a fixed shape or coated onto a refractory supporting substrate.

* * * * *